B. W. PARKER.
HOPPER BOTTOM CART.
APPLICATION FILED JULY 6, 1908.

934,831.

Patented Sept. 21, 1909.
2 SHEETS—SHEET 1.

WITNESSES:
Walter A. Greenburg
Anna M. Dorr

INVENTOR
Byron W. Parker
BY 
ATTORNEYS

B. W. PARKER.
HOPPER BOTTOM CART.
APPLICATION FILED JULY 6, 1908.
934,831.
Patented Sept. 21, 1909.
2 SHEETS—SHEET 2.
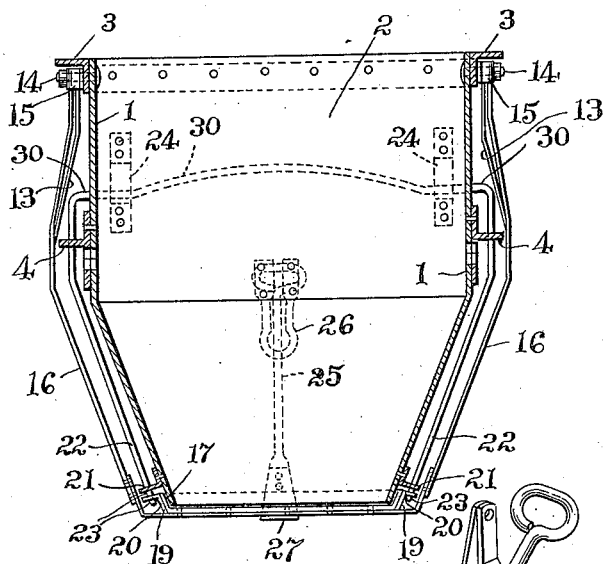
Fig. 3.
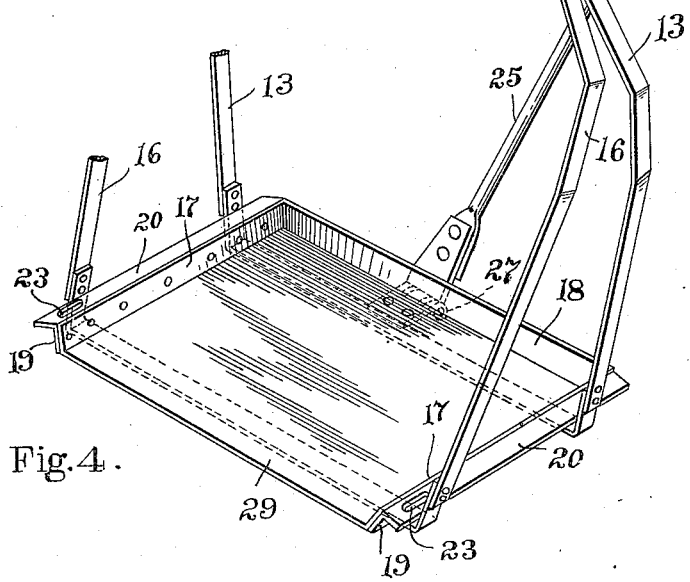
Fig. 4.
WITNESSES:
Walter A. Greenburg
Anna M. Dorr.
INVENTOR
Byron W. Parker
BY 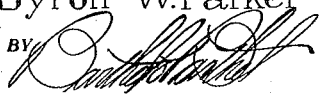
ATTORNEYS

UNITED STATES PATENT OFFICE.

BYRON W. PARKER, OF DETROIT, MICHIGAN.

HOPPER-BOTTOM CART.

934,831.

Specification of Letters Patent.   Patented Sept. 21, 1909.

Application filed July 6, 1908. Serial No. 441,967.

*To all whom it may concern:*

Be it known that I, BYRON W. PARKER, a citizen of the United States of America, residing at Detroit, in the county of Wayne and State of Michigan, have invented certain new and useful Improvements in Hopper-Bottom Carts, of which the following is a specification, reference being had therein to the accompanying drawings.

This invention relates to carts and more especially to those of hopper bottom type for carrying coal, dirt, grain and like material.

One of the objects of the invention is to provide a cart for loading or lightering vessels, and like purposes, which may be easily pushed by hand between decks of a vessel and along narrow gang-ways, and must therefore be well balanced when loaded and of proper proportion for the passageways.

Another object of the invention is to furnish a cart especially adapted for coaling passenger steamers which discharges readily into a comparatively narrow hatch over which the cart is drawn, without scattering its load on the deck.

The invention consists in the matters hereinafter set forth, and more particularly pointed out in the appended claims.

Figure 1:
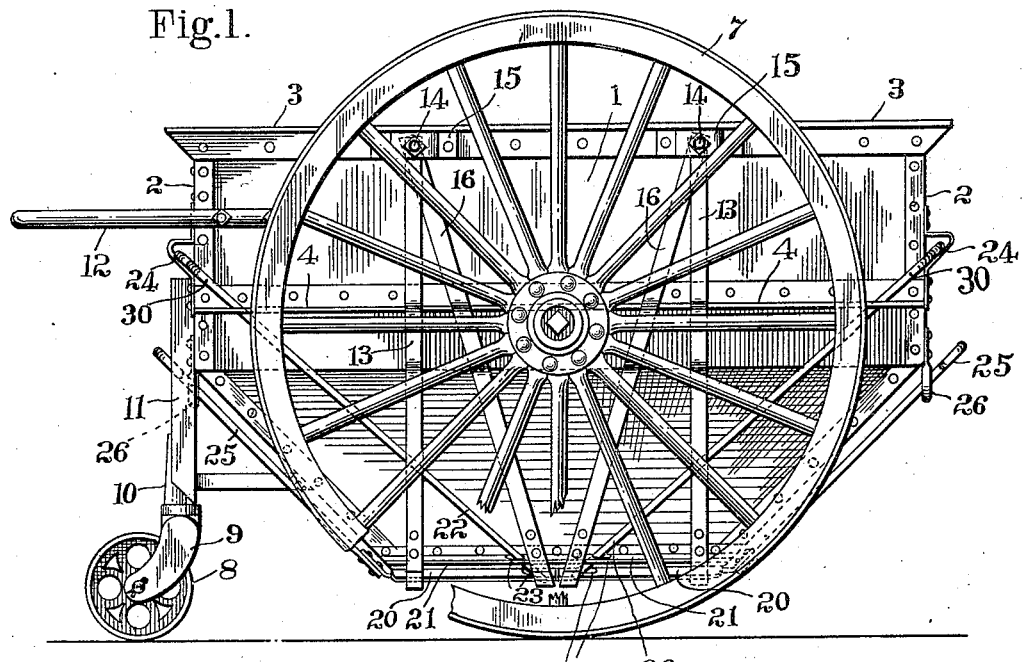
Figure 2:
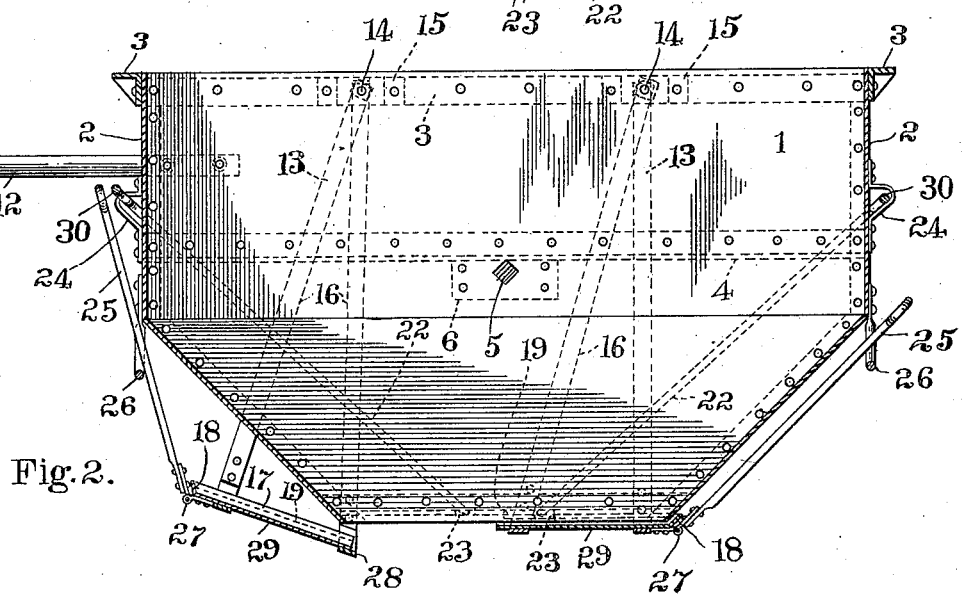
Figure 2:

In the drawings, Figure 1 is a view in side elevation, partially broken away, of a cart embodying features of the invention. Fig. 2 is a view in side elevation and section of the cart body, with one of the hopper doors open. Fig. 3 is a view in central, vertical section through the cart body. Fig. 4 is a view in detail of a hopper door.

Referring to the drawings, a cart body, preferably of sheet metal, has side-walls 1 and end-walls 2 whose upper portions are vertical and whose lower portions are convergent, forming a hopper bottom with an opening, central in the body. Suitably disposed angle irons 3 stiffen the body at its upper margin, and similar horizontal angles 4 reinforce the sides near their middle. An axle 5, preferably squared, extends through apertures in the sides, which are reinforced by suitable plates 6, at about the center of gravity of the cart body when loaded, and bearing wheels 7 are journaled in the usual manner on the axle ends, and are so proportioned that the hopper opening is close to the ground. A caster wheel 8 whose yoke 9 is swiveled in a bearing block 10 secured between struts 11 on the body holds the cart in normal position and a tubular handle 12 is likewise furnished.

At each end of the cart a hanger 13 consisting of a metal strap bent to conform to the body is pivoted so as to swing below the hopper by bolts 14 or the like passing through the angle irons 3 and bracket irons 15, the pivots being so arranged that each hanger when in normal position passes under the hopper opening near one end thereof. Each hanger supports the outer end of a door 29 the inner end being carried by an obliquely disposed stirrup 16 pivoted on the hanger bolts 14. The doors have upturned sides 17 and outer ends 18 which close over the margins of the hopper opening. Angle irons 20 on each door are so disposed that their horizontal flanges bear upwardly against the horizontal flanges 21 of angle irons on the hopper sides when the door is closed and the latter is held in place by a latch rod 30 whose downturned ends 22 extend through mating slots 23 in the superposed flanges of the meeting angle irons. The latch rod passes around the body end at convenient height over supporting brackets 24 of suitable design. A handle bar 25 whose upper part rests on a guide 26, and whose lower end is connected by a hinge 27 to the outer part of the door, enables the operator to swing the door open. The lower edge of the bar may be notched at intervals to engage the guide and hold the door at any point desired. One of the doors has a batten strip 28, or is otherwise arranged to close tightly on the companion door. By this arrangement of parts, a well balanced cart is obtained that is readily handled in narrow passages and has large carrying capacity.

One of the features is the peculiar arrangement of the doors, which allows the hopper to extend nearly to the ground, and still swing clear of the hopper at once when released owing to the disposition of the pivotal support. This obviates the binding common to slide doors. Another feature is the arrangement of the door whereby it acts as a chute to direct the falling material, the ledges or upturned margins keeping the contents from scattering. By partly pulling back either door, the load may be directed one way or the other. Another advantage is the arrangement of the doors and their hangers whereby the doors open readily under load, as their normal tendency when released is to swing down and back, but they move on such a long radius that they are readily shifted without much effort.

Obviously, changes in the details of construction may be made without departing from the spirit of the invention, and I do not care to limit myself to any particular form or arrangement of parts.

What I claim as my invention is:—

1. A cart comprising a body whose side and end walls converge as a hopper bottom having a horizontal outlet, bearing wheels supporting the body, angle irons secured on the side walls along the hopper outlet, doors each consisting of a plate having upturned sides and end adapted to close over the hopper outlet, angle irons on the plate sides adapted to bear upwardly against the side angles, a latch for each door adapted to engage registering slots in the superposed angle iron flanges, and a handle hinged to each door at its lower end and resting on a guide bracket near its upper end.

2. A cart comprising a body having side and end walls converging to form a hopper bottom with horizontal outlet, an axle extending through the body above the outlet, bearing wheels journaled on the axle, angle irons secured on the side walls along the edges of the hopper outlet, a pair of doors having flanged sides and outer ends adapted to close over the hopper outlet and angle irons on the sides adapted to seat themselves on the side wall angle flanges, means pivoted to the upper part of the cart body supporting each door adapted to swing under the hopper outlet, a latch rod for each door bent to conform to the body whose middle portion is supported by brackets on the end walls of the body and whose ends are adapted to engage mating slots in the door and hopper flanges when the doors are closed, and handles each hinged at its lower end to the outer end of a door and supported near its upper end by a guide on the cart body.

3. A cart comprising a body having side and end walls converging to form a hopper bottom with horizontal outlet, an axle extending through the body above the outlet, bearing wheels journaled on the axle, angle irons secured on the side walls along the edges of the hopper outlet, a pair of doors having flanged sides and outer ends adapted to close over the hopper outlet and angle irons on the sides adapted to seat themselves on the side wall angle flanges, a hanger strap bent to conform to the body and pivoted by bolts at its upper end to the upper part of the body to swing beneath the hopper and secured at its middle portion to the outer end of a door, a stirrup passing under the body whose upper ends are pivoted on the hanger bolts and whose middle portion is secured to the inner end of a door, a latch rod for each door bent to conform to the body whose middle portion is supported by brackets on the end walls of the body and whose ends are adapted to engage mating slots in the door and hopper flanges when the doors are closed, and handles each hinged at its lower end to the outer end of a door and supported near its upper end by a guide on the cart body.

4. A cart comprising a rectangular sheet metal body the lower portions of whose side and end walls converge and form a hopper bottom having a central, horizontal opening, an axle extending through apertures in the upper portions of the side walls over the hopper outlet, bearing wheels journaled on the axle ends, a caster wheel supporting one end of the body, angle irons secured on the side walls along the edges of the hopper outlet, a pair of doors having flanged sides and outer ends adapted to close over the hopper outlet and angle irons on the sides adapted to seat themselves on the side wall angle flanges, means pivoted to the upper part of the cart body supporting each door adapted to swing under the hopper outlet, a latch rod for each door bent to conform to the body whose middle portion is supported by brackets on the end walls of the body and whose ends are adapted to engage mating slots in the door and hopper flanges when the doors are closed, and handles each hinged at its lower end to the outer end of a door and supported near its upper end by a guide on the cart body.

In testimony whereof I affix my signature in presence of two witnesses.

BYRON W. PARKER.

Witnesses:
C. R. STICKNEY,
A. M. DORRS.